No. 878,901.  
PATENTED FEB. 11, 1908.  
J. W. SHELBOURN.  
THRESHING MECHANISM.  
APPLICATION FILED FEB. 28, 1906.

2 SHEETS—SHEET 1.

WITNESSES:  
INVENTOR  
J. W. Shelbourn  
BY  
Attorneys

No. 878,901.

PATENTED FEB. 11, 1908.

J. W. SHELBOURN.

THRESHING MECHANISM.

APPLICATION FILED FEB. 28, 1906.

2 SHEETS—SHEET 2.

WITNESSES:

INVENTOR

J. W. Shelbourn

BY

Attorneys.

UNITED STATES PATENT OFFICE.

JOHN W. SHELBOURN, OF GRAND ISLAND, NEBRASKA.

THRESHING MECHANISM.

No. 878,901.　　　　Specification of Letters Patent.　　　　Patented Feb. 11, 1908.

Application filed February 28, 1906. Serial No. 303,420.

*To all whom it may concern:*

Be it known that I, JOHN W. SHELBOURN, a citizen of the United States, residing at Grand Island, in the county of Hall, State of Nebraska, have invented certain new and useful Improvements in Threshing Mechanism; and I do hereby declare the following to be a full, clear, and exact description of the invention, such as will enable others skilled in the art to which it appertains to make and use the same.

This invention relates to threshing mechanism and has for its object to provide a mechanism including a concave provided with series of teeth, the series being arranged for independent adjustment and the concave being arranged for bodily adjustment with respect to the cylinder.

Other objects and advantages will be apparent from the following description.

Figure 1:
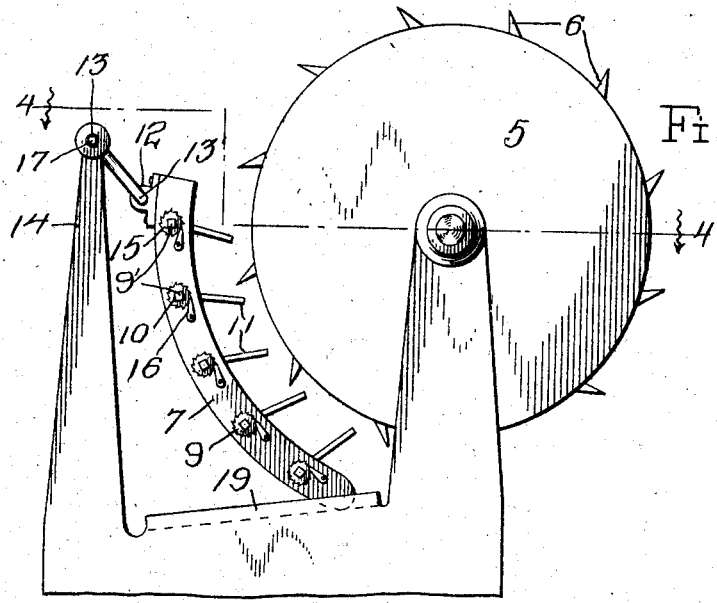
Figure 2:
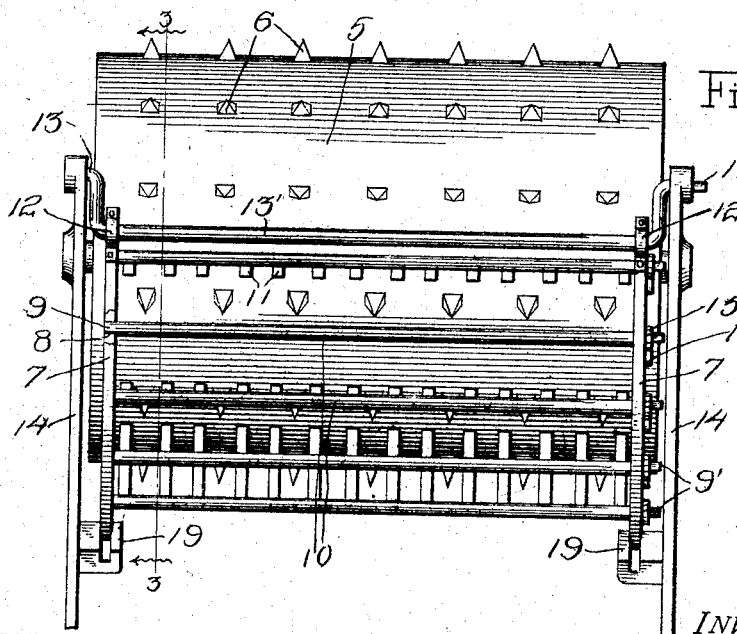
Figure 3:
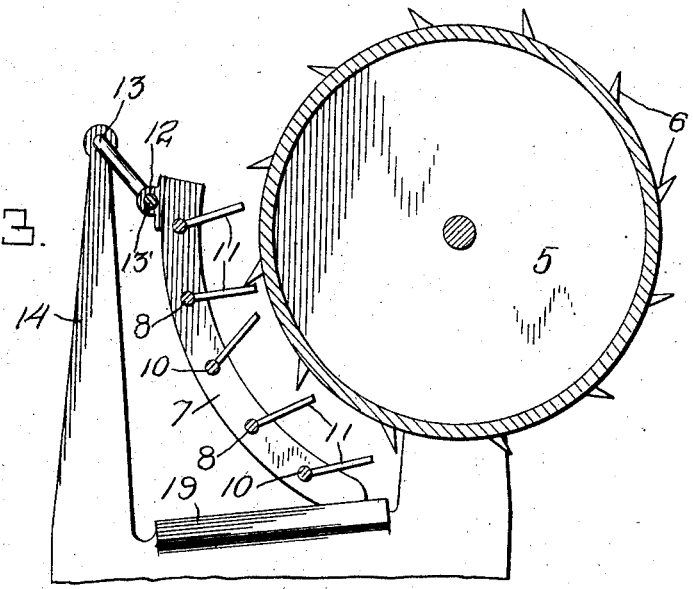
Figure 4:
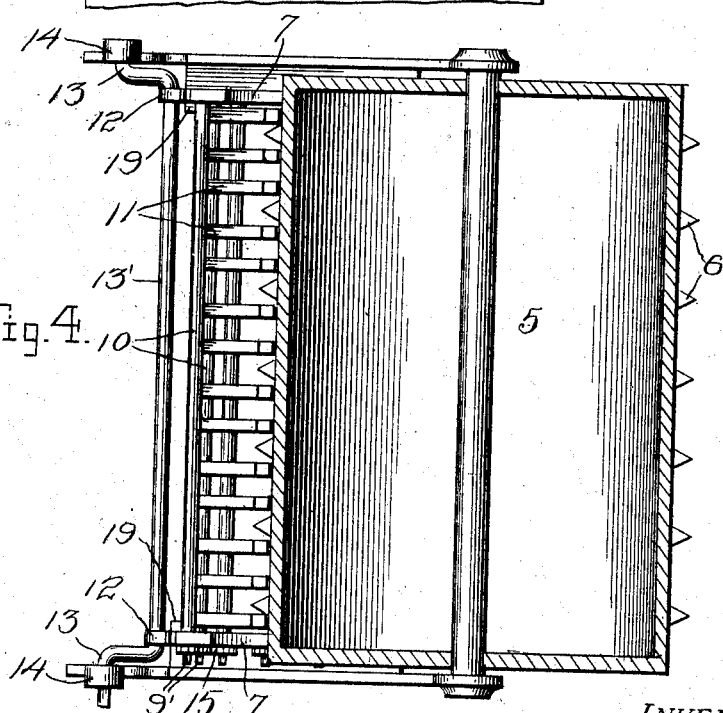

In the drawings forming a portion of this specification and in which like numerals of reference indicate similar parts in the several views, Figure 1 is a view of a portion of the mechanism embodying the present invention, the cylinder being shown in end elevation. Fig. 2 is a view looking at right angles to Fig. 1 and showing the crank shaft. Fig. 3 is a section on line 3—3 of Fig. 2 taken transversely of the cylinder, several of the tooth bars being set at different angles. Fig. 4 is a view showing the tooth bars in top plan and the cylinder in section on line 4—4 of Fig. 1.

Referring now to the drawings, there is shown a revoluble cylinder 5 having peripheral teeth 6 arranged in the usual manner. At one side of the cylinder, there are disposed a pair of arcuate end plates 7 which lie concentric with the cylinder and which also lie at opposite ends thereof. These end plates are provided with a plurality of alining pairs of perforations 8 and in each pair are engaged the trunnion ends 9 of tooth bars 10 which carry teeth 11 and these tooth bars are movable to vary the angle of their teeth with respect to the cylinder 5.

The end plates 7 are each provided at their upper ends with transverse outwardly extending sleeves 12 which register for the reception of the crank portion 13' of the crank shaft 13 mounted at its ends in suitable brackets 14 and this crank shaft is thus operable to move the concave formed by the end plates 7 and the tooth bars 10 toward and away from the cylinder 5.

One trunnion 9 of each of the tooth bars 10 carries a rack wheel 15, these rack wheels lying outwardly of the adjacent end plates 7 and pivoted to this end plate, there are a plurality of dogs 16 one for each rack wheel, which are disposed for engagement of the rack wheels to hold them against rotation.

A handle is provided for engagement of a squared end 17 of the shaft 13 and may also be engaged with the squared ends 9' of the trunnions 9 which carry the racks 15, and it will thus be seen that the tooth bars may be moved independently of each other to bring their teeth toward and away from the cylinder and that the concave may be bodily moved through operation of the shaft 13.

Guides 19 are provided for the lower ends of the end plates 7 and also act as supports therefor.

What is claimed is:

In an adjustable threshing mechanism, the combination with a revolubly mounted cylinder, of a concave disposed in operative relation to the cylinder, said concave including arcuate end plates, tooth bars revolubly engaged in the end plates and extending longitudinally of the cylinder, said tooth bars being arranged for independent movement, teeth carried by the bars and extending toward the cylinder, means for holding the bars at different points of their movement, brackets, a shaft mounted at its ends in the brackets and having a crank portion, sleeves carried by the arcuate plates and in which the crank portion of the shaft is revolubly engaged, said shaft being movable to move the concave toward and away from the cylinder, and guides for the lower ends of the plate.

In testimony whereof, I affix my signature, in presence of two witnesses.

JOHN W. SHELBOURN.

Witnesses:
A. M. HARGIS,
A. L. AYER.